US012695984B2

(12) United States Patent
Kumar Agrawal et al.

(10) Patent No.: US 12,695,984 B2
(45) Date of Patent: Jul. 28, 2026

(54) METHODS AND ELECTRONIC DEVICES ENABLING A VIDEO RECORDING MODE OF OPERATION AS A FUNCTION OF SUPPORT CONDITION

(71) Applicant: Motorola Mobility LLC, Chicago, IL (US)

(72) Inventors: Amit Kumar Agrawal, Bangalore (IN); Rahul Bharat Desai, Chicago, IL (US); Srikanth Raju, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 204 days.

(21) Appl. No.: 18/642,540

(22) Filed: Apr. 22, 2024

(65) Prior Publication Data

US 2025/0330701 A1     Oct. 23, 2025

(51) Int. Cl.
 *H04N 23/667* (2023.01)
 *G06F 3/01* (2006.01)
 *H04N 23/60* (2023.01)

(52) U.S. Cl.
 CPC ........... *H04N 23/667* (2023.01); *G06F 3/017* (2013.01); *H04N 23/64* (2023.01)

(58) Field of Classification Search
 CPC ...... H04N 23/667; H04N 23/64; H04N 23/90; G06F 3/017
 See application file for complete search history.

(56) References Cited

U.S. PATENT DOCUMENTS

| | | | |
|---|---|---|---|
| 11,635,931 B2 | 4/2023 | Kumar Agrawal | |
| 2015/0121228 A1 | 4/2015 | Lee | |
| 2023/0188827 A1* | 6/2023 | Ito | H04N 23/611 348/78 |
| 2024/0077956 A1* | 3/2024 | Lee | G06F 3/017 |
| 2024/0319768 A1* | 9/2024 | Kumar Agrawal | ... G06F 1/1677 |
| 2025/0133158 A1 | 4/2025 | Emmert et al. | |

OTHER PUBLICATIONS

"Galaxy Z Flip", Unknown exact availability date but believed to be prior to filing of present application; Viewed online May 6, 2021 at https://www.samsung.com/us/mobile/galaxy-z-flip/.
"Nubia Watch", Flexible wristwatch; Unknown exact availability date but believed to be prior to filing of present application; Available online at https://www.nubiamart.com/nubia-watch.html? srsltid=AfmBOopV9m6natcLzCC8Q19r_ 8GSen9YwaVePoUZntvX44gQTAoCR-JA.

(Continued)

*Primary Examiner* — Christopher K Peterson
(74) *Attorney, Agent, or Firm* — Philip H. Burrus, IV

(57) ABSTRACT
A method in an electronic device includes detecting, with at least a first sensor, a first device housing of the electronic device being pivoted about a hinge relative to a second device housing to a deformed geometry where the first device housing and second device housing define a substantially orthogonal angle. The method includes detecting, with at least a second sensor, a rotational lifting operation of the electronic device in three-dimensional space. In response to the at least a first sensor detecting the deformed geometry and the at least a second sensor detecting the rotational lifting operation, the method includes causing, with one or more processors, an image capture device of the electronic device to enter a video recording mode of operation.

20 Claims, 8 Drawing Sheets

(56)              References Cited

OTHER PUBLICATIONS

"The Most Futuristic Flexible Display Phone", YouTube; Unbox Therapy Channel; Nubia Alpha Watch; Premiered Mar. 29, 2029; available at https://www.youtube.com/watch?v=JbY8DM8c-h0&t=292s.

Mertens , "Both Samsung and LG unveil new smartwatches with flexible (plastic-based) AMOLEDs", OLED-info; Aug. 28, 2024; available online at https://www.oled-info.com/both-samsung-and-lg-unveil-new-smartwatches-flexible-plastic-based-amoleds.

Williams, Jeffery , "Notice of Allowance", U.S. Appl. No. 18/676,308, filed May 28, 2024; Mailed Jul. 21, 2025.

* cited by examiner

DETECT TRANSITION IN DEVICE GEOMETRY

DETECT HALF-FOLD GEOMETRY

DETECT CAMCORDER GRIP WHILE HALF-FOLD

DETECT LIFT TO ALIGN HALF-FOLD VERTICALLY

ACUTATE VIDEO RECORD FUNCTION

Buster's Chicken Stand

ACUTATE VIDEO RECORD FUNCTION/OPTIONALLY PERFORM OTHER F(X)s

901 — HEEL OF HAND ON ONE SIDE OF ONE HALF OF DEVICE

902 — MULTIPLE FINGERS ON OTHER SIDE OF SAME HALF AS HEEL

903 — OPTIONALLY PALM PASSING AROUND EXTERIOR SIDE OF HELD HALF

904 — OPTIONALLY THUMB ON END OF HELD HALF

905 — OPTIONALLY GRAVITY DIRECTION PASSING THROUGH MINOR DIMENSION OF ELECTRONIC DEVICE

906 — OPTOINALLY REAR CAMERA DETECTS USER WATCHING DISPLAY

803

CAMCORDER GRIP?

METHODS AND ELECTRONIC DEVICES ENABLING A VIDEO RECORDING MODE OF OPERATION AS A FUNCTION OF SUPPORT CONDITION

BACKGROUND

Technical Field

This disclosure relates generally to electronic devices, and more particularly to electronic devices having user interfaces operable to present content.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer candy bar devices, while others prefer clamshell devices. To satisfy the latter, it would be desirable to have an improved hinged electronic device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
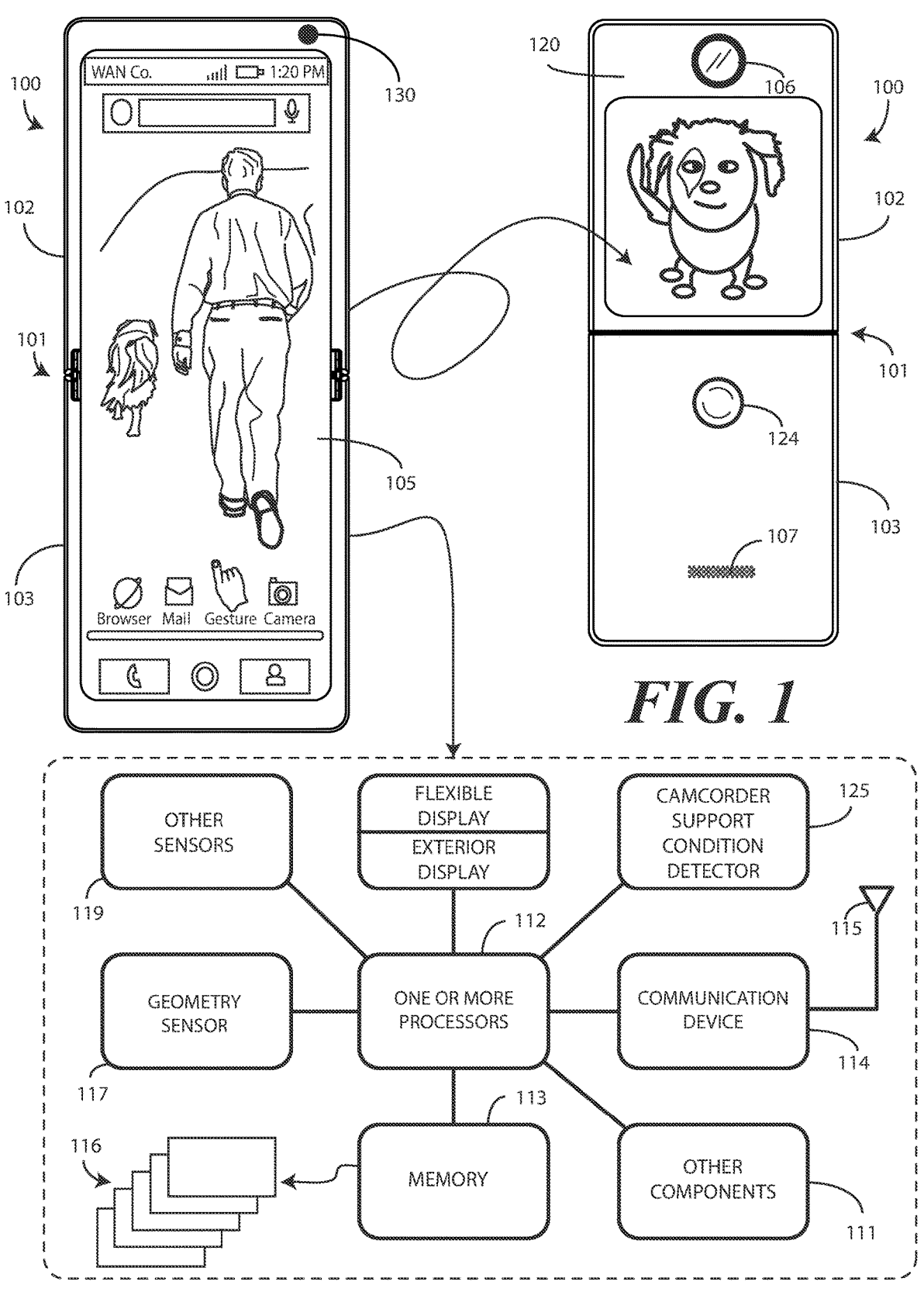
FIG. 1 illustrates one explanatory electronic device configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to enabling, in response to detecting a partially deformed form factor defined by a first device housing of an electronic device being pivoted about a hinge relative to a second device housing of the electronic device partially between an axially displaced open position and a closed position, and also in response to detecting, with one or more other sensors, gesture input indicating a camcorder support condition is supporting the electronic device in three-dimensional space while the partially deformed geometric form factor is occurring, enabling, with one or more processors in response to detecting the partially deformed geometric form factor and the camcorder support condition being applied to the second device housing of the electronic device, a video recording mode of operation of an image capture device of the electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of causing an image capture device to enter a video recording mode of operation in response to the electronic device being supported in a camcorder orientation while the electronic device is in a deformed geometric form factor. As such, these functions may be interpreted as steps of a method to perform, in response to at least a first sensor detecting a deformed geometry and at least a second sensor detecting a rotational lifting operation, causing an image capture device of an electronic device to enter a video recording mode of operation.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that is geometrically deformable. In one or more embodiments, the electronic device includes a first device housing that is pivotable about a hinge relative to a second device housing between a closed position and an axially displaced open position. In one or more embodiments, the hinge is configured as a "friction hinge" that allows a user to pivot the first device housing relative to the second device housing to any position between the closed position and the axially displaced open position with that device geometry being retained by a frictional element situated in the hinge. When between the axially displaced open position and the closed position, this can be referred to as a "deformed geometry" or "partially deformed geometric form factor." In other embodiments, the electronic device will include a deformable housing allowing a user to move a first device housing portion relative to a second device housing portion to various deformed geometric form factors between the closed position and the axially displaced open position.

Embodiments of the disclosure contemplate that the partially deformed geometric form factor allows for unique ways in which video recordings can be captured by an image capture device situated on an exterior side of the first device housing or second device housing such that the image capture device is exposed when the electronic device is in both the axially displaced open position and the closed position. Indeed, by holding, for example, the second device housing while the first device housing is pivoted about the hinge relative to the second device housing to a position where the first device housing is substantially orthogonal with the second device housing, the electronic device resembles a traditional "camcorder" that was held with one hand with a viewfinder flipped outward from the main body of the camcorder. Thus, holding an electronic device in a partially deformed geometric form factor by one device housing can provide nostalgic memories of the stand-alone video camcorder that existed primarily in the pre-smartphone era.

Embodiments of the disclosure are equipped with an image capture device that can be utilized when the electronic device is in the partially deformed geometric form factor that mimics the orientation of the stand-alone camcorder. To wit, in accordance with embodiments of the disclosure a method in an electronic device comprises detecting, with one or more sensors, a partially deformed geometric form factor defined by a first device housing of the electronic device being pivoted about a hinge relative to a second device housing of the electronic device partially between an axially displaced open position and a closed position. The method also comprises detecting, with one or more other sensors, gesture input indicating a camcorder support condition is supporting the electronic device in three-dimensional space while the partially deformed geometric form factor is occurring. In one or more embodiments, when both are detected, one or more processors of the electronic device enable a video recording mode of operation of an image capture device of the electronic device.

In addition to automatic actuation of the video recording mode of operation, embodiments of the disclosure contemplate that capturing video while the electronic device is in the camcorder support condition offers unique benefits by stabilizing the device so that video captured is smoother and steadier. Additionally, when the electronic device comprises a flexible display spanning the hinge or, alternatively, a first display situated to one side of the hinge and a second display situated to another side of the hinge, the partially deformed geometric form factor and camcorder support condition allows the videographer to see the video as its being captured. When the first device housing includes an exterior display situated adjacent to the image capture device capturing the video, the subject of the video is able to watch himself or herself on the external display as well.

Since it can be quite difficult to access the user actuation targets and other control devices to initiate the capture of video recordings when the electronic device is in a partially deformed geometric form factor, embodiments of the disclosure advantageously automatically initiate the video recording mode of operation when a person partially deforms the electronic device and then lifts it so as to be held like a traditional camcorder. Indeed, in one or more embodiments an electronic device includes a first device housing coupled to a second device housing by a hinge such that the first device housing is pivotable about the hinge relative to the second device housing between a closed position and an axially displaced open position. In one or more embodiments, one or more sensors are operable to determine a deformed geometric form factor of the electronic device when the first device housing is partially pivoted about the hinge relative to the second device housing between the axially displaced open position and the closed position.

One or more other sensors are then operable to detect when the electronic device is supported in a camcorder orientation in three-dimensional space. In one or more embodiments, one or more processors are then operable to cause an image capture device of the electronic device to enter a video recording mode of operation in response to the electronic device being supported in the camcorder orientation while the electronic device is in the deformed geometric form factor.

When the first device housing is pivoted about the hinge relative to the second device housing such that the first device housing and second device housing define substantially an orthogonal angle, embodiments of the disclosure contemplate that it can be quite challenging to press a record user actuation target being presented on a display spanning an interior side of the second device housing while holding the electronic device in a camcorder support condition. To overcome this issue, in one or more embodiments an "up/down gesture" while the first device housing and second device housing define a substantially orthogonal angle is used to initiate, or stop, a video recording session.

In one or more embodiments, to initiate a video recording session, a user folds the first device housing relative to the second device housing such that the first device housing and second device housing define substantially a ninety-degree angle. In one or more embodiments, when the user grasps the second device housing and rotates the electronic device by ninety degrees such that the electronic device is being supported in a camcorder support condition, one or more sensors of the electronic device detect this camcorder support condition and initiate a video recording operation by an image capture device of the electronic device.

By contrast, when the user desires to stop the video recording operation, the user pivots the electronic device out of the camcorder support condition in the opposite direction. In one or more embodiments, this causes the video recording operation to cease. In one or more embodiments, other features can be performed, such as trimming the ending segments of the video which encompass the final rotation to stop the video, thereby ensuring that no unwanted blurriness remains in the final video.

In one or more embodiments, a method in an electronic device comprises detecting, with at least a first senor, a first device housing of the electronic device being pivoted about a hinge relative to a second device housing to a deformed geometry where the first device housing and the second device housing define a substantially orthogonal angle. In one or more embodiments, the method comprises detecting, with at least a second sensor, a rotational lifting operation of the electronic device in three-dimensional space. In one or more embodiments, in response to the at least a first sensor detecting the deformed geometry and the at least a second sensor detecting the rotational lifting operation, the method comprise causing, by one or more processors, the image capture device of the electronic device to enter a video recording mode of operation.

In some embodiments, this ability to deform the electronic device and manipulate it between the closed position and the axially displaced open position allows for the inclusion of a second display, which is sometimes known as a "quick view display" or "qvd" due to the fact that it is always exposed regardless of whether the electronic device is in the axially displaced open position or the closed position. By contrast, in some embodiments the primary display is concealed when the electronic device is in the closed position and revealed as the electronic device transitions from the closed position to the axially displaced open position. Inclusion of the second display allows users of the subject of an automatically initiated video recording mode of operation to see themselves when the video recording mode of operation is initiated.

Embodiments of the disclosure advantageously allow a user to elegantly start and stop a video recording mode of operation without having to rely upon physical keys, and without having to awkwardly tap a record user actuation target presented on a display of the electronic device. The gesture-based initiation of a video recording mode of operation allows for a more natural and "easy to learn" capability for the system. Other advantages offered by embodiments of the disclosure will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, a partially open position, shown and described below with reference to FIG. 3, and an open position, shown and described below with reference to FIG. 4.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge 101. However, in other embodiments two or more hinges can be incorporated into the electronic device 100 to allow it to be folded in multiple locations.

While the illustrative electronic device 100 of FIG. 1 includes a hinge 101, embodiments of the disclosure are not so limited. In other embodiments, electronic devices configured in accordance with embodiments of the disclosure will not include a hinge 101. Illustrating by example, the electronic device 100 may include a flexible device housing, or the first device housing and second device housing can each comprise flexible device housings. A single device housing, for instance, can be manufactured from bendable materials. In still other embodiments, the electronic device 100 can be bendable via a combination of hinge components and non-hinge components.

Accordingly, in another embodiment the electronic device 100 of FIG. 1 includes a single housing. In one or more embodiments, that housing is flexible. In one embodiment, the housing may be manufactured from a malleable, bendable, or physically deformable material such as a flexible thermoplastic, flexible composite material, flexible fiber material, flexible metal, organic or inorganic textile or polymer material, or other materials. The housing could be formed from a single flexible housing member or from multiple flexible housing members.

In other embodiments, the housing could be a composite of multiple components. For instance, in another embodiment the housing could be a combination of rigid segments connected by hinges or flexible materials. Still other constructs will be obvious to those of ordinary skill in the art having the benefit of this disclosure.

The illustrative electronic device 100 of FIG. 1 includes multiple displays. A first display 105, also referred to as the interior display or the rear-facing display, is concealed when the first device housing 102 is pivoted about the hinge 101 relative to the second device housing 103 to a closed position. For example, the first display 105 is concealed in FIG. 2 below. This first display 105 is then revealed when the first device housing 102 is pivoted about the hinge 101 relative to the second device housing 103 from the closed position to an axially displaced open position. Thus, the first display 105 is revealed as the electronic device 100 transitions from the closed position of FIG. 2 to the open position of FIG. 4.

In one or more embodiments, the electronic device 100 also includes at least a second display 120. In the illustrative embodiment of FIG. 1, the second display 120 can be referred to as an exterior display, quick view display, or front-facing display, as the second display 120 is exposed both when the first device housing 102 and the second device housing 103 are pivoted about the hinge 101 to the closed position, the axially displaced open position, or any position therebetween. Thus, the second display 120 is exposed both in the axially displaced open position of FIG. 1 and the closed position of FIG. 2. In one or more embodiments, each of the first display 105 and the second display 120 is a high-resolution display.

While shown coupled to the first device housing 102, it should be noted that the second display 120 could be coupled to either of the first device housing 102 or the second device housing 103. In other embodiments, the second display 120 can be coupled to the first device housing 102, while a third display (not shown) is coupled to the second device housing 103. Thus, electronic devices configured in accordance with embodiments of the disclosure can include displays situated at different positions.

As with the second display 120, the first display 105 can also be coupled to either or both of the first device housing 102 or the second device housing 103. In this illustrative embodiment, the first display 105 is coupled to both the first device housing 102 and the second device housing 103 and spans the hinge 101. In other embodiments, the "first" display can be two displays, with one coupled to the first device housing 102 and another coupled to the second device housing 103. In either case, this first display 105 is considered to be an "interior" display because it is concealed when the first device housing 102 and the second device housing 103 are in the closed position.

In one or more embodiments, either or both of first display 105 or second display 120 can be touch-sensitive. Where this is the case, users can deliver user input to one or both of the first display 105 or the second display 120 by delivering touch input from a finger, stylus, or other objects disposed proximately with the first display 105 or the second display 120.

In the illustrative embodiment of FIG. 1, since the first display 105 spans the hinge 101, it is configured to be flexible. For instance, in one embodiment the first display 105 is configured as an organic light emitting diode (OLED) display fabricated on a flexible plastic substrate. This allows the first display 105 to be flexible so as to deform when the first device housing 102 pivots about the hinge 101 relative to the second device housing 103. However, it should be noted that other types of displays would be obvious to those of ordinary skill in the art having the benefit of this disclosure. In other embodiments, conventional, rigid displays can be disposed to either side of the hinge rather than using a flexible display.

In one or more embodiments, the first display 105 is configured as an OLED constructed on flexible plastic substrates to allow the first display 105 to bend in accordance with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the first display 105 may be formed from multiple layers of flexible material such as flexible sheets of polymer or other materials.

In this illustrative embodiment, the first display 105 is coupled to the first device housing 102 and the second device housing 103. Accordingly, the first display 105 spans the hinge 101 in this embodiment. In one or more embodiments, the first display 105 can instead be coupled to one, or two, spring-loaded, slidable trays that situate within one or both of the first device housing 102 and the second device housing 103. The use of one or two slidable trays advantageously allows the first display 105 to be placed in tension when the electronic device 100 is in the open position. This causes the first display 105 to be flat, rather than wavy due to mechanical memory effects, when the electronic device 100 is in the open position.

Features can be incorporated into the first device housing 102 and/or the second device housing 103. Examples of such features include an image capture device 106, which in this embodiment is an exterior or front facing imager. The image capture device 106, which can be any number of types of image capture devices, has its lens situated such that it is directed away from a user who is holding the electronic device 100 and facing the first display 105. This allows the image capture device 106 to receive light directed toward the electronic device 100 from a location in front of the user when the user is holding the electronic device 100 and facing the first display 105.

A second, rear facing imager 130 can be positioned on the interior side of the electronic device 100 to receive light and images directed toward the first display 105. When a user is holding the electronic device 100 and looking at the first display, this second, rear facing imager 121 can be used to take a selfie without turning the electronic device 100 around. While two imagers are shown in the illustrative embodiment of FIG. 1, it should be noted that embodiments of the disclosure can include additional imagers mounted in different positions that can be actuated to capture images from different angles.

Other examples of features that can be incorporated into the first device housing 102 and/or the second device housing 103 include an optional speaker port 107. While shown situated on the exterior of the electronic device 100 in FIG. 1, the optional speaker port 107 could also be placed on the interior side as well. In this illustrative embodiment, a user interface component 124, which may be a button or touch sensitive surface, can also be disposed along the exterior side of the second device housing 103. As noted, any of these features shown being disposed on the exterior side of the electronic device 100 could be located elsewhere, such as on the interior side or minor sides in other embodiments.

A block diagram schematic of the electronic device 100 is also shown in FIG. 1. In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present content offerings including images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the electronic device 100 includes one or more geometry sensors 117, operable with the one or more processors 112, to detect a particular geometry, geometric form factor, or deformation state of the electronic device 100. Illustrating by example, in one or more embodiments the one or more geometry sensors 117 can detect a bending operation that causes the first device housing 102 to pivot about the hinge 101 relative to the second device housing 103, thereby transforming the electronic device 100 into a deformed geometry, such as when the electronic device 100 is between an axially displaced open position, shown below in FIG. 4, and a closed position, shown below in FIG. 2, with one example of the deformed geometry shown in FIG. 5.

In one embodiment, the geometry sensors 117 comprise passive resistive devices manufactured from a material with an impedance that changes when the material is bent, deformed, or flexed. By detecting changes in the impedance as a function of resistance, the one or more processors 112 can use the one or more geometry sensors 117 to detect bending of the first device housing 102 about the hinge 101 relative to the second device housing 103. In one or more embodiments, each geometry sensor 117 comprises a bi-directional flex sensor that can detect flexing or bending in two directions. In one embodiment, the one or more geometry sensors 117 have an impedance that increases in an amount that is proportional with the amount it is deformed or bent. Other types of geometry sensors 117 will be obvious to those of ordinary skill in the art having the benefit of this disclosure.

In one or more embodiments, the electronic device 100 comprises a camcorder support condition detector 125. In one or more embodiments, the camcorder support condition detector 125 can detect gesture operations transforming the electronic device 100 into the camcorder support condition based on information received from the various sensors, including the one or more geometry sensors 117 or other sensors 119. Illustrating by example, in one or more embodiments the camcorder support condition detector 125 detects gesture input indicating a camcorder support condition is supporting the electronic device. This can be done, for example, by using one or more sensors 119 to detect a lifting operation elevating the electronic device from a first position to a second position in three-dimensional space. In one or more embodiments, the camcorder support condition detector 125 works with the one or more geometry sensors 117 and the other sensors 119 to detect a lifting operation moving the electronic device to a position in three-dimensional space where a gravity direction passes through a width of the first device housing 102 or second device housing 103.

In still other embodiments, the camcorder support condition detector 125 detects a gesture input performing a lifting operation moving the electronic device to a position in the three-dimensional space where the second, rear facing imager 121 captures one or more images of an eye of the user of the electronic device while the one or more geometry sensors 117 detect that a partially deformed geometric form factor is occurring. In one or more embodiments, the camcorder support condition detector 125 detects the camcorder support condition when the one or more sensors 119 determine that a camcorder grip is being applied to the electronic device, such as when the heel of a hand is supporting a first minor surface of the second device housing 103.

In one or more embodiments, when the camcorder support condition detector 125 detects the camcorder support condition and the one or more geometry sensors 117 detect the first device housing 102 of the electronic device being pivoted about the hinge 101 relative to the second device housing 103 to a deformed geometry where the first device housing 102 and the second device housing 103 define a substantially angle, the one or more processors 112 are operable to cause the image capture device 106 of the electronic device 100 to enter a video recording mode of operation. When the one or more geometry sensors 117 detect the electronic device 100 transforming out of the partially deformed geometric form factor, i.e., to the axially displaced open position or the closed position, or when the camcorder support condition detector 125 determines that the electronic device 100 transitions out of the camcorder support condition in three-dimensional space, the one or more processors 112 can cause the video recording mode of operation to cease.

The camcorder support condition detector 125 may also generate commands or execute control operations based upon information received from a combination of the one or more geometry sensors 117 or the other sensors 119. Alternatively, the camcorder support condition detector 125 can generate commands or execute control operations based upon information received from the one or more geometry sensors 117 or the other sensors 119 alone. Moreover, the camcorder support condition detector 125 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, a light sensor, and one or more switches. Touch sensors may used to indicate whether any of the user actuation targets present on the display 105 or display 120 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 111 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figures 2, 3, 4:
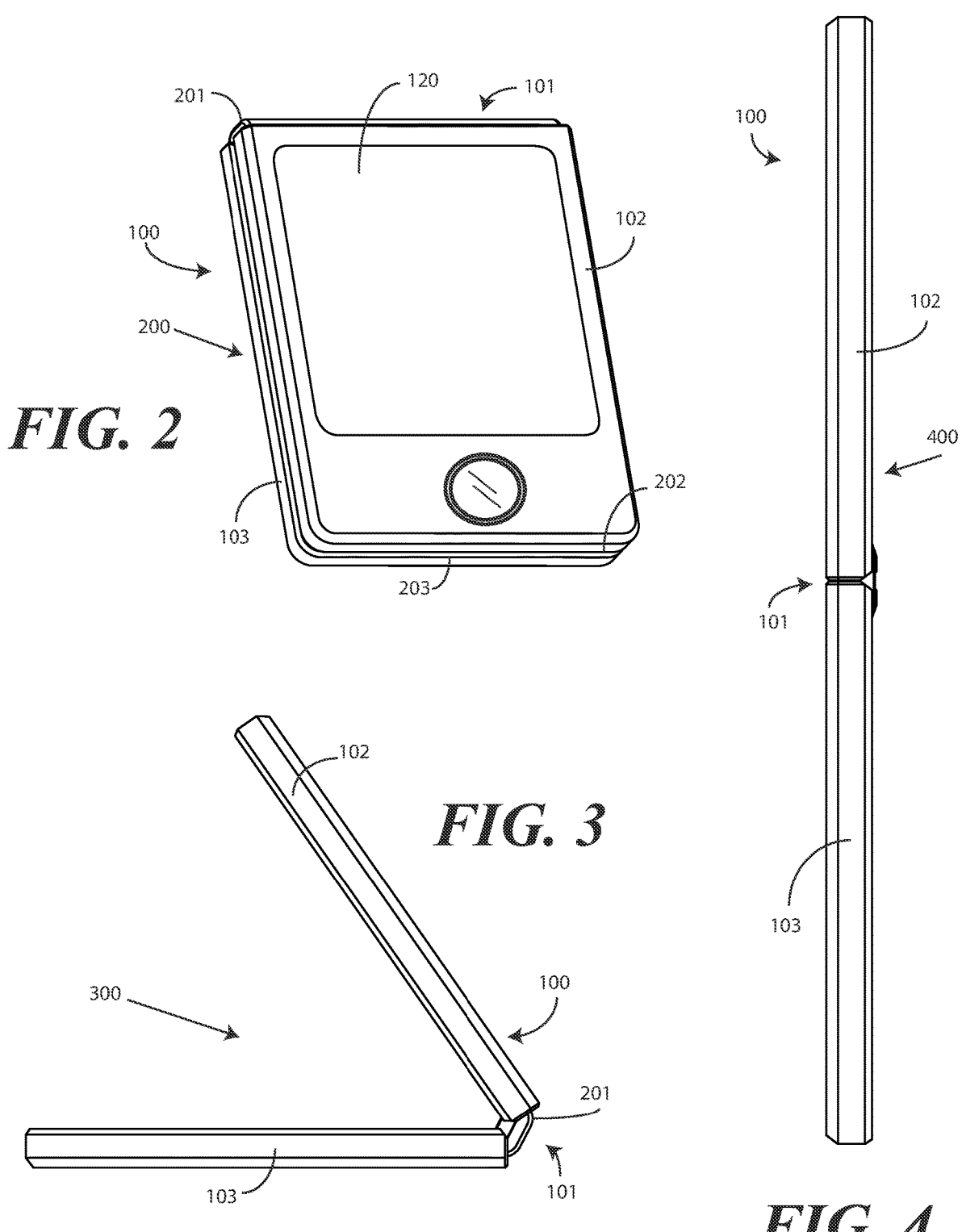
FIG. 2 illustrates a perspective view of one explanatory electronic device in accordance with one or more embodiments of the disclosure in a closed position.
FIG. 3 illustrates a side elevation view of one explanatory electronic device in accordance with one or more embodiments of the disclosure in a partially open position.
FIG. 4 illustrates one explanatory method in accordance with one or more embodiments of the disclosure.

Turning now to FIG. 2, illustrated therein is the electronic device 100 in a closed state. In this state, the first device housing 102 has been pivoted about the hinge 101 toward the second device housing 103 to a closed position 200. When in the closed position 200, a front surface 202 of the first device housing 102 abuts a front surface 203 of the second device housing 103. Additionally, in this illustrative embodiment, a hinge housing 201 comprising the hinge 101 is revealed when the electronic device 100 is in the closed position 200. In other embodiments, the hinge housing 201 will remain concealed when the first device housing 102 pivots about the hinge 101 relative to the second device housing 103 to the closed position 200. Effectively, in either embodiment, the first device housing 102 and the second device housing 103 are analogous to clam shells that have been shut by the clam, thereby giving rise to the "clamshell" style of device. When the clamshell opens, the flexible display (105) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 200.

In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 200 will be obvious to those of ordinary skill in the art having the benefit of this disclosure. As shown, the exterior display 120 is visible and exposed when the electronic device is in the closed position 200.

Turning now to FIG. 3, the electronic device 100 is shown in a geometric form factor defined by a deformed geometry such that the first device housing 102 and the second device housing 103 are between the closed position (200) of FIG. 2 and an axially displaced open position. Where the hinge 101 includes frictional elements, the electronic device 100 may remain in this geometric form factor until a user pivots one of the first device housing 102 or the second device housing 103 about the hinge 101 to another geometric form factor.

The geometric form factor of FIG. 3 is that of a partially open position 300, thus being in a partially deformed geometric form factor. Specifically, the first device housing 102 is pivoting about the hinge 101 away from the second device housing 103 toward an open position. The open position 300 shown in FIG. 3 can be referred to as a "tent position." In the side elevation view of FIG. 3, the hinge housing 201 is exposed between the first device housing 102 and the second device housing 103.

Turning now to FIG. 4, illustrated therein is the electronic device 100 in an axially displaced open position 400. In the axially displaced open position 400, the first device housing 102 is rotated about the hinge 101 so as to be axially displaced 180-degrees out of phase with the second device housing 103, thereby revealing the flexible display (105). In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display 105, the flexible display 120 has been elongated into a flat position.

Figure 5:
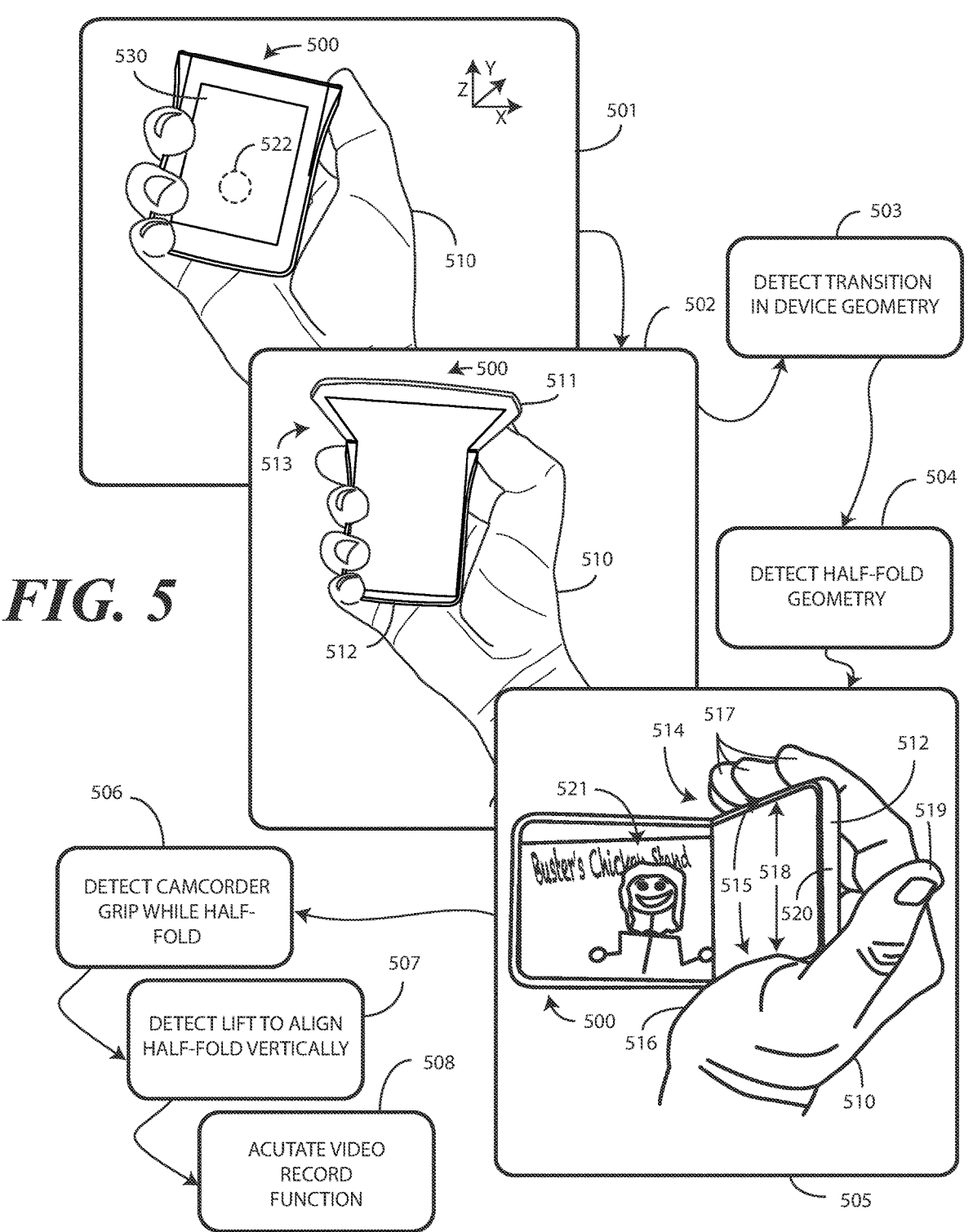
FIG. 5 illustrates one explanatory method in accordance with one or more embodiments of the disclosure.

Embodiments of the disclosure contemplate that when the electronic device is between the axially displaced open position 400 of FIG. 4 and the closed position (200) of FIG. 2, and more particularly between the axially displaced open position 400 of FIG. 4 and the tent position of FIG. 3, such as when the first device housing 102 and the second device housing 103 define a substantially orthogonal angle, a user can grip the second device housing 103 sideways and can use the image capture device (106) situated on the exterior side of the first device housing 102 in a camcorder mode of operation. Turning now to FIG. 5, illustrated therein are one or more method step showing how this can occur.

Beginning at step 501, a user 510 is holding an electronic device 500 configured in accordance with one or more embodiments of the disclosure. Like the electronic device 100 of FIGS. 1-4, the electronic device 500 of FIG. 5 includes a first device housing that is pivotable relative to a second device housing about a hinge between a closed position, shown at step 501, and an axially displaced open position like that shown in FIG. 4. In this illustrative embodiment, the electronic device 500 includes an image capture device 522 that is on the external side of the first device housing such that the image capture device 522 is exposed regardless of whether the electronic device 500 is in the axially displaced open position, the closed position, or somewhere in between the axially displaced open position and the closed position.

In this illustrative embodiment, the image capture device 522 is situated beneath an exterior display 530, which is also exposed when the electronic device 500 is in either the closed position or the axially displaced open position. In one or more embodiments, one or more pixels situated above the image capture device 522 are configured to transition to a translucent state when the image capture device 522 captures images. In other embodiments, the image capture device 522 and exterior display 530 can be configured in a side-by-side relationship as was the case in FIGS. 1-4 above. Other locations for the image capture device 522 and exterior display 530 will be obvious to those of ordinary skill in the art having the benefit of this disclosure.

At step 502, the user 510 transitions the first device housing 511 relative to the second device housing 512 to a partially deformed geometric form factor 513 defined by the first device housing 511 being pivoted about a hinge relative to the second device housing 512 partially between the axially displaced open position and the closed position. In this illustrative embodiment, the partially deformed geometric form factor 513 is defined by a deformed geometry where the first device housing 511 and the second device housing 512 define a substantially orthogonal angle, as shown at step 502.

At step 503, one or more sensors of the electronic device 500 detect that the geometry of the electronic device 500 is changing. At step 504, the one or more sensors detect the electronic device 500 ceasing its change in geometry at the partially deformed geometric form factor 513 defined by the first device housing 511 of the electronic device 500 being pivoted about the hinge relative to the second device housing 512 of the electronic device 500 to this position that is partially between the axially displaced open position and the closed position.

As shown at step 505, the user 510 has grasped the second device housing 512 using a camcorder support condition 514. As shown at step 505, in one or more embodiments the camcorder support condition results from a camcorder grip 515 being applied to the second device housing 512 of the electronic device 500. In one or more embodiments, the camcorder grip 515 is defined by a heel 516 of a hand supporting a first minor surface of the second device housing 512. In this illustrative embodiment, the camcorder grip 515 is also defined by one or more fingers 517 supporting a second minor surface of the second device housing 512. As shown at step 505, the first minor surface of the second device housing 512 being supported by the heel 516 of the hand is separated from the second minor surface being supported by the one or more fingers 517 by a width 518 of the second device housing 512.

While the thumb 519 of the user 510 is shown being off the third minor surface 520 of the second device housing 512 at step 505 so that the third minor surface 520 can be more readily seen, in other embodiments the camcorder grip 515 is further defined by the thumb 519 supporting the third minor surface 520 of the second device housing 512 extending from the first minor surface to the second minor surface. An example of this is illustrated and described below with reference to FIG. 3.

What's more, the user 510 has delivered a gesture input to the electronic device 500 by performing a lifting operation lifting the electronic device 500 from a first position, shown at step 502, to a second position in three-dimensional space, which is shown at step 505. At step 506, one or more other sensors of the electronic device 500 detect the camcorder grip 515, while the one or more other sensors detect the gesture input at step 507 that indicates that the camcorder support condition 514 is supporting the electronic device 500 in three-dimensional space while the partially deformed geometric form factor 513 is occurring. At step 508, one or more processors of the electronic device 500, in response to detecting the partially deformed geometric form factor 513 and the camcorder support condition 514 being applied to the second device housing 512 of the electronic device 500, enable a video recording mode of operation of the image capture device 522.

Since, as noted above, functions may be executed out of order from that shown or discussed, including substantially concurrently or in reverse order, depending on the functionality involved, the video recording mode of operation 521 is operating at step 505. As shown, the user 510 of the electronic device 500 is recording his friend, Kayla, standing in front of Buster's World-Famous Chicken Stand, where chicken is served nine different ways—each of them delicious.

As shown in FIG. 5, embodiments of the disclosure provide an electronic device 500 that is geometrically deformable. In one or more embodiments, the electronic device 500 includes a first device housing 511 that is pivotable about a hinge relative to a second device housing 512 between a closed position and an axially displaced open position.

In one or more embodiments, the hinge is configured as a "friction hinge" that allows a user to pivot the first device housing 511 relative to the second device housing 512 to any position between the closed position and the axially displaced open position with that device geometry being retained by a frictional element situated in the hinge. Since the partially deformed geometric form factor 513 allows for unique ways in which video recordings can be captured by an image capture device 522 situated on an exterior side of the first device housing 511 or second device housing 512 such that the image capture device 522 is exposed when the electronic device 500 is in both the axially displaced open position and the closed position.

Indeed, by holding, for example, the second device housing 512 while the first device housing 511 is pivoted about the hinge relative to the second device housing 512 to a position where the first device housing 511 is substantially orthogonal with the second device housing 512, the electronic device 500 resembles a traditional "camcorder" that was held with one hand with a viewfinder flipped outward from the main body of the camcorder. This resemblance is clearly shown at step 505. Thus, holding the electronic device 500 in a partially deformed geometric form factor 513 by one device housing can provide nostalgic memories of the stand-alone video camcorder that existed primarily in the pre-smartphone era.

The method illustrated in FIG. 5 comprises detecting, with one or more sensors, a partially deformed geometric form factor 513 defined by a first device housing 511 of the electronic device being pivoted about a hinge relative to a second device housing 512 of the electronic device 500 partially between an axially displaced open position and a closed position. The method also comprises detecting, with one or more other sensors, gesture input indicating a camcorder support condition 514 is supporting the electronic device 500 in three-dimensional space while the partially deformed geometric form factor 513 is occurring. In one or more embodiments, when both are detected, one or more processors of the electronic device 500 enable a video recording mode of operation 521 of an image capture device 511 of the electronic device 500 at step 508.

In addition to automatic actuation of the video recording mode of operation 521, embodiments of the disclosure contemplate that capturing video while the electronic device 500 is in the camcorder support condition 514 offers unique benefits by stabilizing the electronic device 500 so that video captured is smoother and steadier. Additionally, when the electronic device 500 comprises a flexible display spanning the hinge, as is the case in FIG. 5, or alternatively a first display situated to one side of the hinge and a second display situated to another side of the hinge, the partially deformed geometric form factor 513 and camcorder support condition 514 allows the user 510 to see the video as its being captured as shown at step 505. When the first device housing includes an exterior display 530 situated adjacent to, or atop of, the image capture device 511 capturing the video, the subject of the video (here, Kayla) is able to watch herself on the exterior display 530 as well.

Since it can be quite difficult to access the user actuation targets and other control devices to initiate the capture of video recordings when the electronic device 500 is in a partially deformed geometric form factor 513, embodiments of the disclosure advantageously automatically initiate the video recording mode of operation 521 when a person partially deforms the electronic device 500 and then lifts it so as to be held like a traditional camcorder. Indeed, in one or more embodiments an electronic device 500 includes a first device housing 511 coupled to a second device housing 512 by a hinge such that the first device housing 511 is pivotable about the hinge relative to the second device housing 512 between a closed position and an axially displaced open position. In one or more embodiments, one or more sensors are operable to determine a deformed geometric form factor of the electronic device 500 when the first device housing 511 is partially pivoted about the hinge relative to the second device housing 512 between the axially displaced open position and the closed position.

One or more other sensors are then operable to detect when the electronic device 500 is supported in a camcorder orientation in three-dimensional space. In one or more embodiments, one or more processors are then operable to cause an image capture device 522 of the electronic device 500 to enter a video recording mode of operation 521 in response to the electronic device 500 being supported in the camcorder orientation while the electronic device 500 is in the deformed geometric form factor.

When the first device housing 511 is pivoted about the hinge relative to the second device housing 512 such that the first device housing 511 and second device housing 512 define substantially the orthogonal angle shown at step 502, embodiments of the disclosure contemplate that it can be quite challenging to press a record user actuation target being presented on a display spanning an interior side of the second device housing 512 while holding the electronic device 500 in a camcorder support condition 514. To overcome this issue, in one or more embodiments an "up/down gesture" while the first device housing 511 and second device housing 512 define a substantially orthogonal angle is used to initiate, or stop, a video recording session.

Figure 6:
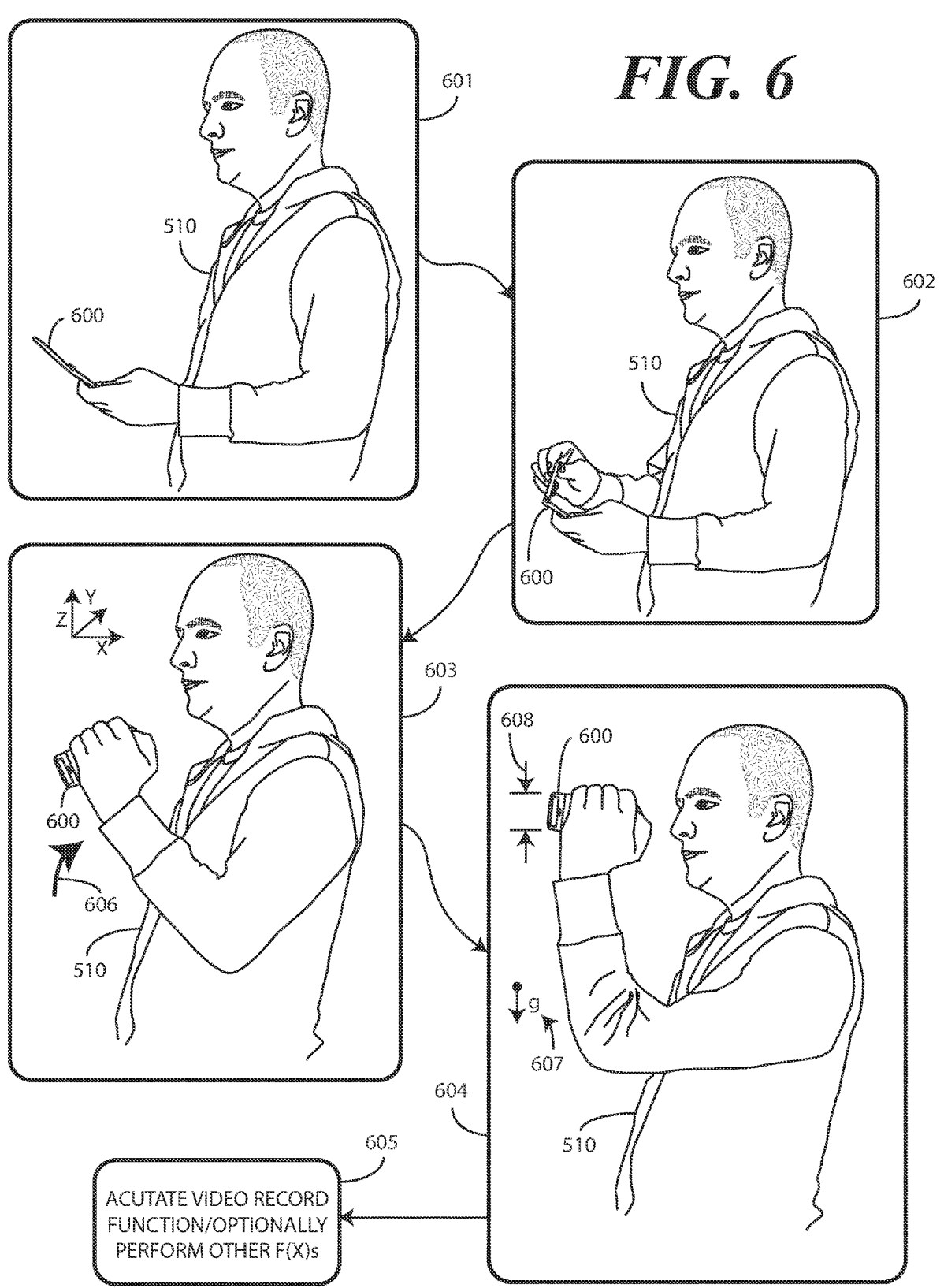
FIG. 6 illustrates one or more method steps in accordance with one or more embodiments of the disclosure.

In one or more embodiments, to initiate a video recording session, a user 510 folds the first device housing 511 relative to the second device housing 512 such that the first device housing 511 and second device housing 512 define substantially a ninety-degree angle. In one or more embodiments, when the user 510 grasps the second device housing 512 and rotates the electronic device 500 by ninety degrees such that the electronic device 500 is being supported in a camcorder support condition 514, one or more sensors of the electronic device 500 detect this camcorder support condition 514 and initiate a video recording mode of operation 521 by an image capture device 522 of the electronic device 500. Turning now to FIG. 6, illustrated therein are one or more method steps illustrating this in more detail.

The user 510 can stop the video recording mode of operation 521 by taking opposite actions. Illustrating by example, when the user 510 desires to stop the video recording mode of operation 521, the user 510 pivots the electronic device 500 out of the camcorder support condition 514 in the opposite direction. In one or more embodiments, this causes the video recording mode of operation 521 to cease. In one or more embodiments, other features can be performed, such as trimming the ending segments of the video which encompass the final rotation to stop the video, thereby ensuring that no unwanted blurriness remains in the final video.

Beginning at step 601, a user 510 is holding an electronic device 600 configured in accordance with one or more embodiments of the disclosure. In this illustrative embodiment, the electronic device 600 includes a first device housing coupled to a second device housing by a hinge. In this illustrative embodiment, the first device housing is pivotable about the hinge relative to the second device housing between a closed position and an axially displaced open position, shown at step 601, and a closed position.

As with the electronic device (100) described above with reference to FIG. 1, the electronic device 600 of FIG. 6 also includes one or more sensors operable to determine a deformed geometric form factor of the electronic device 600 is partially pivoted about the hinge relative to the second device housing between the axially displaced open position and the closed position. At step 602, the user 510 is shown pivoting the first device housing, with his right hand, relative to the second device housing, held in the left hand, toward just such a deformed geometric form factor. At step 602, at least a first sensor within the electronic device 600 detects the first device housing of the electronic device 600 being pivoted about the hinge relative to the second device housing. In one or more embodiments, the 510 continues this pivoting operation until the first device housing and the second device housing define a substantially orthogonal angle. Such a deformed geometry is shown at step 603.

In this illustrative embodiment, the electronic device 600 comprises one or more other sensors operable to detect when the electronic device 600 is supported in a camcorder orientation in three-dimensional space. As described above, these sensors can comprise grip sensors carried by a device housing of the electronic device, an orientation detector such as an inertial measurement unit, accelerometers, gyroscopes, or gravity detection. Other examples of such sensors will be obvious to those of ordinary skill in the art having the benefit of this disclosure.

At step 603, the user 510 is performing a lifting operation 606 in three-dimensional space to deliver a gesture input to one or more of the sensors of the electronic device 600. This lifting operation 606 is completed at step 604, where the user 510 holds the electronic device 600 such that a rear-facing imager of the first device housing of the electronic device 600, akin to the rear-facing image capture device (130) of the electronic device (100) of FIG. 1, is able to capture one or more images of an eye of the user 510 of the electronic device 600.

By comparing step 602 and step 604, it can be seen that the lifting operation 606 moves the electronic device 100 to a position in the three-dimensional space where a gravity direction 607 passes through a width 608 of the first device housing and the second device housing. In one or more embodiments, at least a second sensor, which is different from a first sensor operable to detect the first device housing pivoting about the hinge relative to the second device housing, detects the lifting operation, which is a rotational lifting operation in this illustrative embodiment due to the fact that the user's arm pivots about a shoulder and elbow. As such, as can be seen by comparing step 601 and step 604, the lifting operation causes a rotation of the electronic device 600 in the three-dimensional space by at least ninety degrees (including the fact that the electronic device 600 was rotated out of the page between step 601 and step 604 and clockwise between step 601 and step 604).

In one or more embodiments, the electronic device 600 has one or more processors operable with the various sensors. At step 605, the one or more processors are operable to cause an externally facing image capture device, which is visible in step 603 and step 604, to enter a video recording mode of operation in response to the electronic device being supported in the camcorder orientation of step 604 while in the deformed geometric form factor. Said differently, in response to at least a first sensor detecting the deformed geometry and at least a second sensor detecting a rotational lifting operation, at step 605 the one or more processors cause an image capture device of the electronic device to enter a video recording mode of operation. In one or more embodiments, the video recording mode of operation the video recording mode of operation of the image capture device of the electronic device results in the image capture device capturing one or more video clips.

Other operations can be performed at step 605 as well. Illustrating by example, in one or more embodiments step

605 comprises performing a cropping operation to remove from the one or more video clips any video segments captured by the image capture device while the first device housing was moving about the hinge relative to the second device housing. Thus, in one or more embodiments step 605 comprises cropping video segments captured by the image capture device while in the video recording mode of operation while the first device housing is moving about the hinge relative to the second device housing. Other auxiliary operations capable of being performed at step 605 will be obvious to those of ordinary skill in the art having the benefit of this disclosure.

Figure 7:
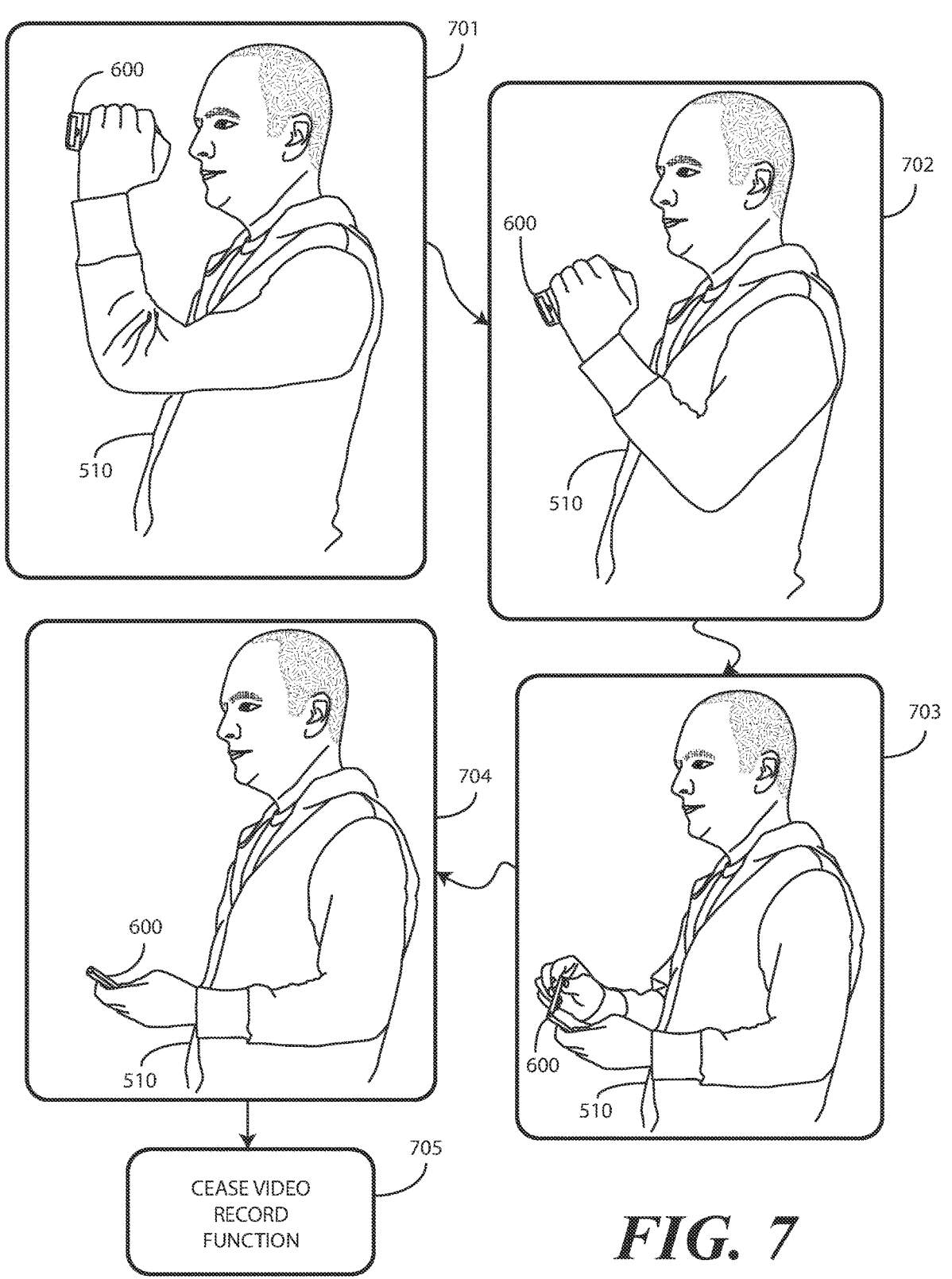
FIG. 7 illustrates one or more other method steps in accordance with one or more embodiments of the disclosure.

In one or more embodiments, the video recording mode of operation can cease when the user 510 either rotates the electronic device 600 out of the camcorder orientation or pivots the first device housing about the hinge relative to the second device housing to the axially displaced open position or closed position. Turning now to FIG. 7, illustrated therein is one or more method steps illustrating how this can occur.

Beginning at step 701, the user 510 is holding the electronic device 600 in the camcorder support condition. However, at step 702 the user begins to rotate the electronic device 600 in a counterclockwise, descending direction from a first elevation to a second elevation, at which the user 510 is holding the electronic device 600 at step 703. In one or more embodiments, this simple cessation of the support of the electronic device 600 in the camcorder support condition causes the one or more processors to cease the video recording mode of operation of the image capture device at step 705.

In other embodiments, the one or more processors can cause the video recording mode of operation to cease when the first device housing pivots to either the axially displaced open position or the closed position. Illustrating by example, as shown at step 703, the user 510 is transitioning the electronic device 600 to the closed position, which is shown at step 704. At step 704, one or more sensors of the electronic device detect the first device housing moving about the hinge relative to the second device housing to the closed position. Accordingly, at step 705 the one or more processors disable the video recording mode of operation of the image capture device.

Of course, a combination of the two methods could be used. Thus, had the user 510 simply closed the electronic device 600 at step 702, rather than pivoting it in three-dimensional space, the video recording mode of operation would cease as well.

Figure 8:
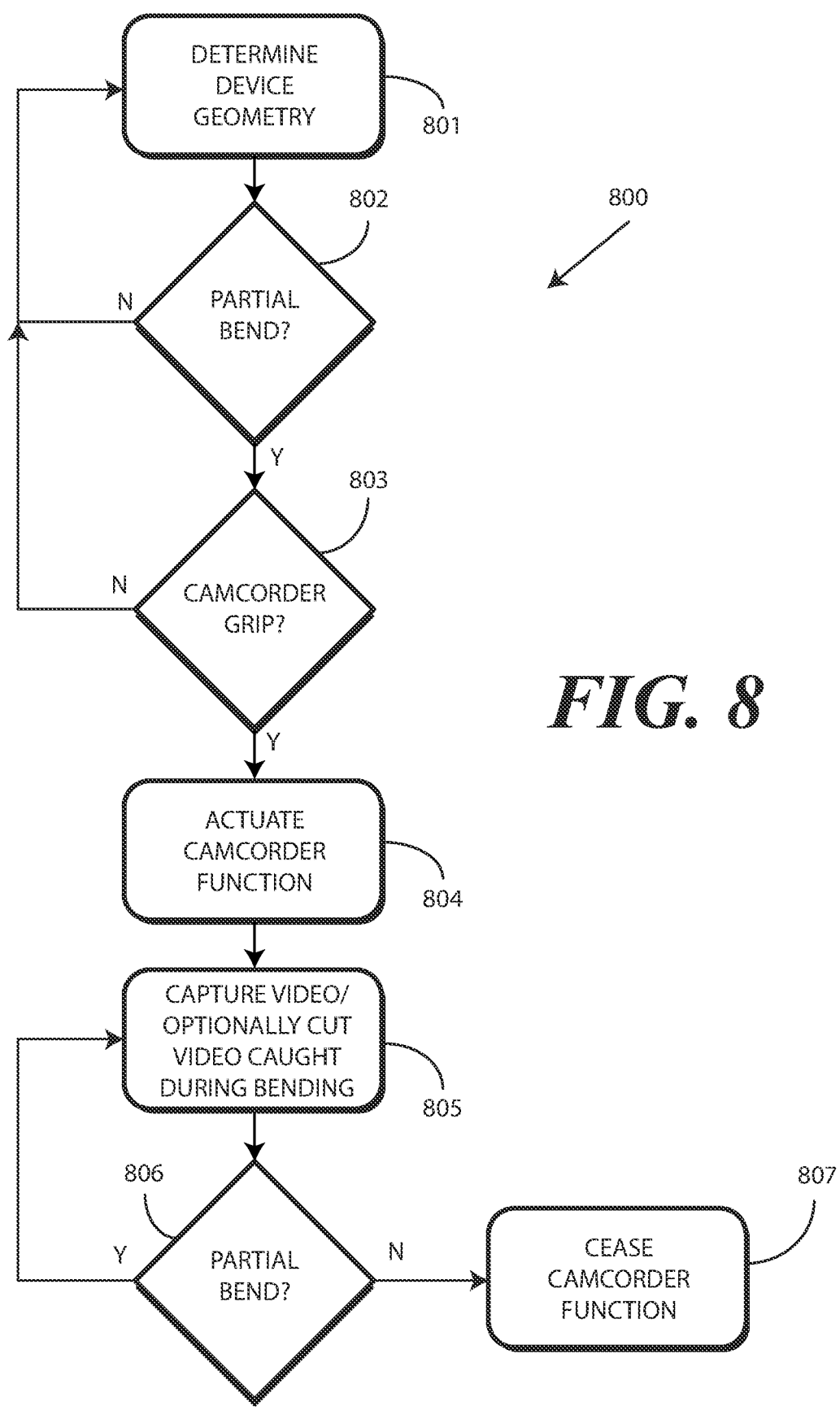
FIG. 8 illustrates another explanatory method in accordance with one or more embodiments of the disclosure.

Turning now to FIG. 8, illustrated therein is one explanatory method 800 in accordance with one or more embodiments of the disclosure. Beginning at step 801, one or more sensors of the electronic device detect a geometric form factor of an electronic device having either a deformable device housing or a first device housing that is pivotable about a hinge relative to a second device housing between an axially displaced open position and a closed position. Decision 802 then determines whether the geometric form factor is deformed partially between an axially displaced open position and a closed position. Where it is, decision 803 determines whether the electronic device is in a camcorder support condition. Otherwise, the method 800 returns to step 801.

Figure 9:
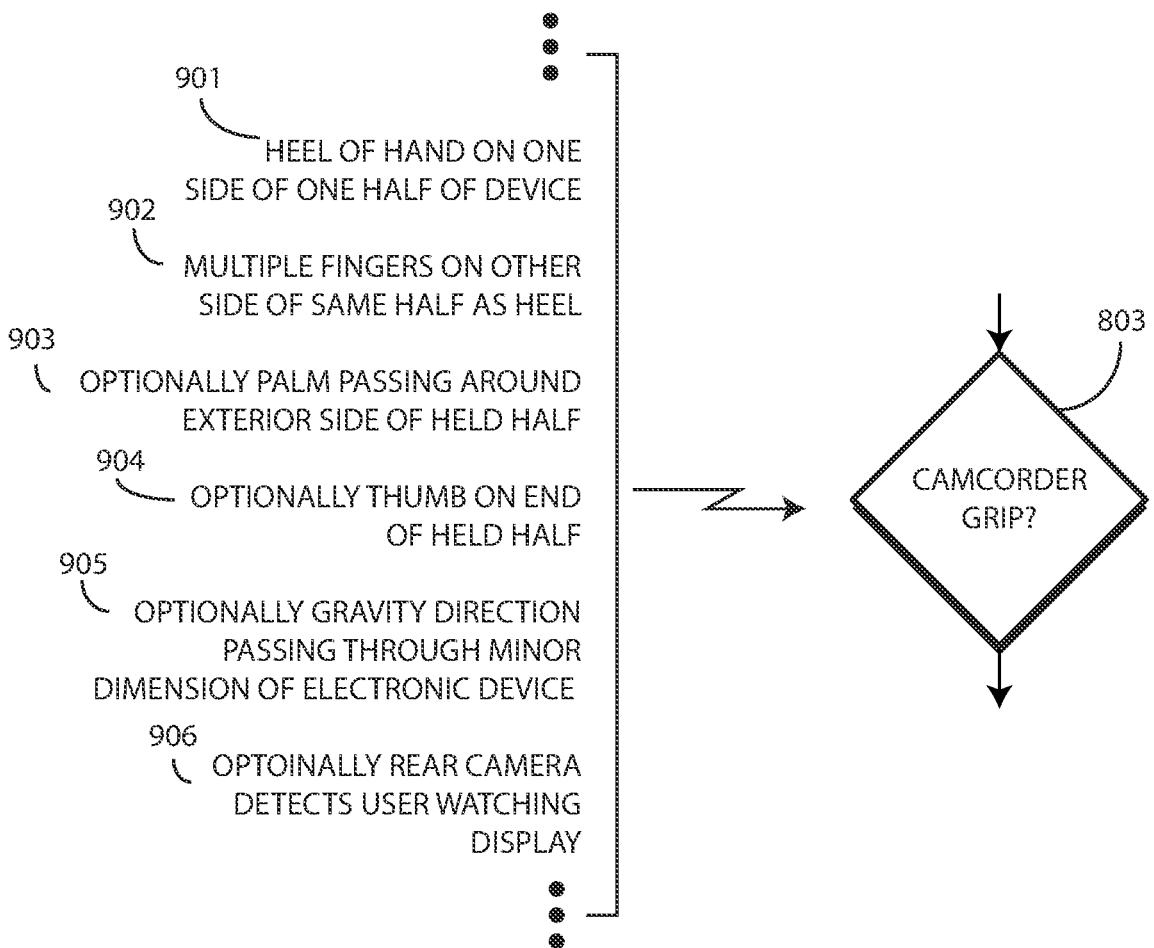
FIG. 9 illustrates one or more method steps in accordance with one or more embodiments of the disclosure.

Decision 803 can be determined in a variety of ways. Turning briefly to FIG. 9, illustrated therein are a few examples. These examples can be used alone or in combination. Other examples will be obvious to those of ordinary skill in the art having the benefit of this disclosure.

In one or more embodiments, decision 803 comprises determining whether a heel 901 of a hand is supporting a minor surface of the second device housing. In one or more embodiments, decision 803 comprises determining whether one or more fingers 902 are supporting a minor surface of the second device housing. Where the two are used together, decision 803 can comprise determining whether a heel 901 of a hand is supporting a first minor surface of the second device housing while one or more fingers 902 support a second minor surface of the second device housing that is separated from the first minor surface by a width of the second device housing.

In one or more embodiments, decision 803 can optionally comprise determining whether a palm 903 is passing around a first major surface of the second device housing. Similarly, decision 803 can optionally determine whether a thumb 904 is supporting a third minor surface of the second device housing extending from a minor surface supported by one or more fingers 902 and another minor surface supported by a heel 901 of the hand.

In still other embodiments, decision 803 can comprise determining whether gravity direction 905 passes through a width of the second device housing and/or first device housing. As noted above, decision 803 can also comprise determining whether a rear-facing image capture device is able to capture one or more images of an eye 906 of a user of the electronic device.

Turning now back to FIG. 8, if decision 803 determines the electronic device is being supported by a camcorder support condition, step 804 can comprise causing an image capture device of the electronic device to enter a video recording mode of operation. Otherwise, the method 800 can return to step 801.

Step 805 can comprise performing a cropping operation to remove from one or more video clips of any video segments captured by the image capture device during the video recording mode of operation while the first device housing was moving about the hinge relative to the second device housing.

Decision 806 can comprise detecting the geometric form factor changing. In one or more embodiments, decision 806 comprises detecting, with one or more sensors, the first device housing moving about the hinge relative to the second device housing to either the axially displaced open position or the closed position. Where this occurs, step 807 can comprise disabling the video recording mode of operation of the image capture device of the electronic device. Otherwise, the video recording mode of operation can continue at step 805.

Thus, in one or more embodiments a method in an electronic device comprises detecting, with at least a first senor, a first device housing of the electronic device being pivoted about a hinge relative to a second device housing to a deformed geometry where the first device housing and the second device housing define a substantially orthogonal angle. In one or more embodiments, the method comprises detecting, with at least a second sensor, a rotational lifting operation of the electronic device in three-dimensional space. In one or more embodiments, in response to the at least a first sensor detecting the deformed geometry and the at least a second sensor detecting the rotational lifting operation, the method comprise causing, by one or more processors, the image capture device of the electronic device to enter a video recording mode of operation.

Embodiments of the disclosure advantageously allow a user to elegantly start and stop a video recording mode of operation without having to rely upon physical keys, and without having to awkwardly tap a record user actuation target presented on a display of the electronic device. The gesture-based initiation of a video recording mode of operation allows for a more natural and "easy to learn" capability for the system. Other advantages offered by embodiments of the disclosure will be described below. Still others will be obvious to those of ordinary skill in the art having the benefit of this disclosure.

Figure 10:
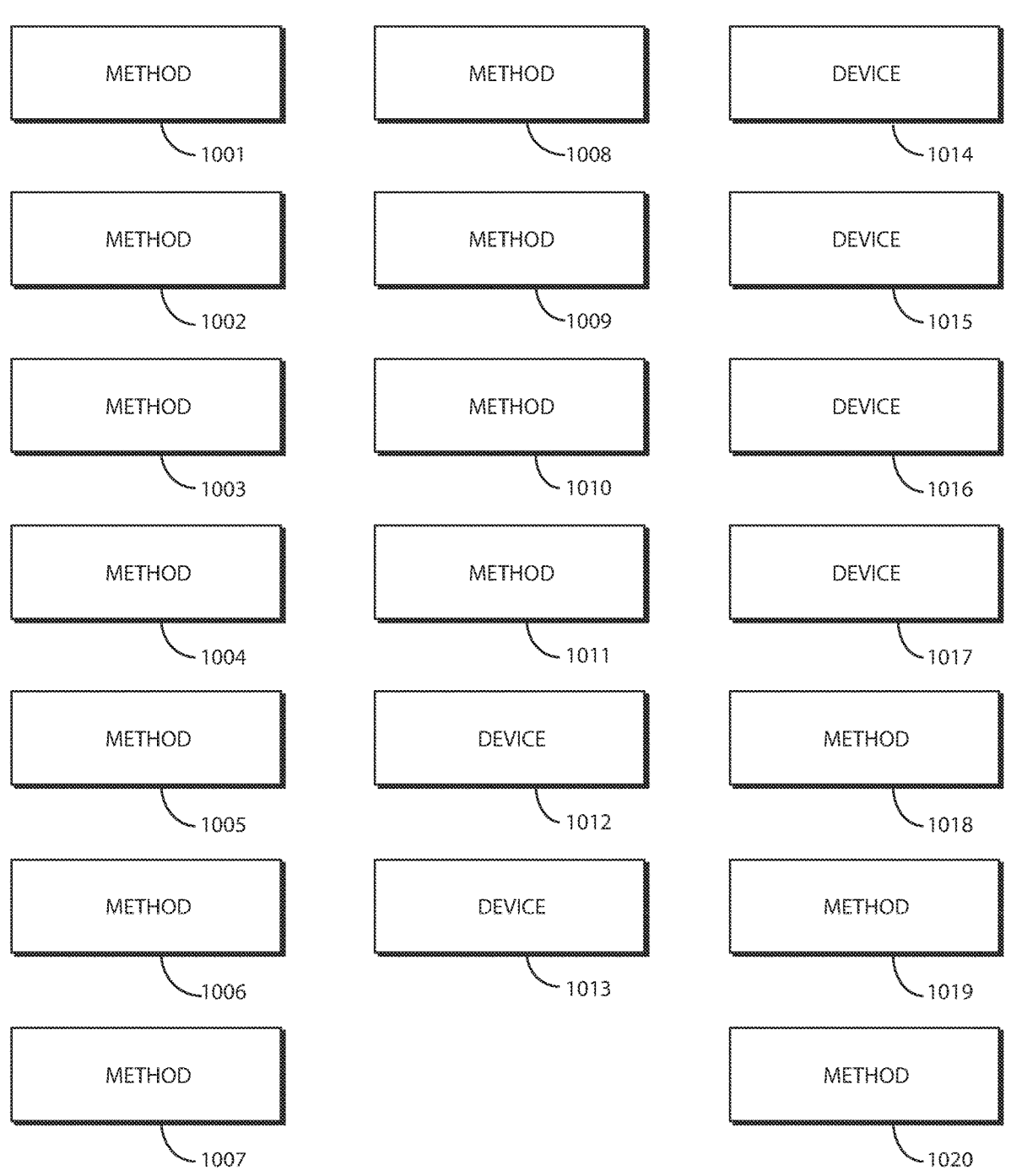
FIG. 10 illustrates various embodiments of the disclosure.

Turning now to FIG. 10, illustrated therein are various embodiments of the disclosure. The embodiments of FIG. 10 are shown as labeled boxes in FIG. 10 due to the fact that the individual components of these embodiments have been illustrated in detail in FIGS. 1-9, which precede FIG. 10. Accordingly, since these items have previously been illustrated and described, their repeated illustration is no longer essential for a proper understanding of these embodiments. Thus, the embodiments are shown as labeled boxes.

At 1001, a method in an electronic device comprises detecting, with one or more sensors, a partially deformed geometric form factor defined by a first device housing of the electronic device being pivoted about a hinge relative to a second device housing of the electronic device partially between an axially displaced open position and a closed position. At 1001, the method comprises also detecting, with one or more other sensors, gesture input indicating a camcorder support condition is supporting the electronic device in three-dimensional space while the partially deformed geometric form factor is occurring.

At 1001, the method comprises enabling, with one or more processors in response to detecting the partially deformed geometric form factor and the camcorder support condition being applied to the second device housing of the electronic device, a video recording mode of operation of an image capture device of the electronic device. At 1002, the gesture input of 1001 comprises a lifting operation elevating the electronic device from a first position to a second position in the three-dimensional space.

At 1003, the gesture input of 1001 comprises a lifting operation moving the electronic device to a position in the three-dimensional space where a gravity direction passes through a width of the first device housing and the second device housing. At 1004, the gesture input of 1001 comprises a lifting operation moving the electronic device to a position in the three-dimensional space where another image capture device captures one or more images of an eye of a user of the electronic device.

At 1005, the gesture input of 1001 comprises a camcorder grip being applied to the electronic device. At 1006, the camcorder grip of 1005 is defined by a heel of a hand supporting a first minor surface of the second device housing.

At 1007, the camcorder grip of 1006 is further defined by one or more fingers supporting a second minor surface of the second device housing separated from the first minor surface by a width of the second device housing. At 1008, the camcorder grip of 1007 is further defined by a thumb supporting a third minor surface of the second device housing extending from the first minor surface to the second minor surface.

At 1009, the video recording mode of operation of 1001 of the image capture device of the electronic device results in the image capture device capturing one or more video clips. At 1009, the method further comprises performing, by the one or more processors, a cropping operation to remove from the one or more video clips any video segments captured by the image capture device while the first device housing was moving about the hinge relative to the second device housing.

At 1010, the method of 1001 further comprises detecting, with the one or more sensors, the first device housing moving about the hinge relative to the second device housing to either the axially displaced open position or the closed position. At 1010, the method comprises disabling, with the one or more processors, the video recording mode of operation of the image capture device of the electronic device.

At 1011, the partially deformed geometric form factor of 1001 comprises the first device housing of the electronic device being pivoted about the hinge relative to the second device housing of the electronic device such that the first device housing and second device housing define substantially an orthogonal angle.

At 1012, an electronic device comprises a first device housing coupled to a second device housing by a hinge such that the first device housing is pivotable about the hinge relative to the second device housing between a closed position and an axially displaced open position. At 1012, the electronic device comprises one or more sensors operable to determine a deformed geometric form factor of the electronic device when the first device housing is partially pivoted about the hinge relative to the second device housing between the axially displaced open position and the closed position and one or more other sensors operable to detect when the electronic device is supported in a camcorder orientation in three-dimensional space.

At 1012, the electronic device comprises an image capture device. At 1012, the electronic device comprises one or more processors operable with the one or more sensors, the one or more other sensors, and the image capture device. At 1012, the one or more processors operable to cause the image capture device to enter a video recording mode of operation in response to the electronic device being supported in the camcorder orientation while the electronic device is in the deformed geometric form factor.

At 1013, the one or more processors of 1012 are operable to cause the image capture device to cease the video recording mode of operation when the first device housing is pivoted about the hinge relative to the second device housing to either the axially displaced open position or the closed position. At 1014, the one or more processors of 1012 are operable to cause the image capture device to cease the video recording mode of operation in response to the one or more other sensors detecting cessation of support of the electronic device in the camcorder orientation in the three-dimensional space.

At 1015, the one or more processors of 1012 are operable to crop video segments captured by the image capture device while in the video recording mode of operation while the first device housing is moving about the hinge relative to the second device housing. At 1016, the one or more other sensors of 1012 comprise grip sensors carried by a device housing of the electronic device. At 1017, the one or more other sensors of 1012 comprise an orientation detector.

At 1018, a method in an electronic device comprises detecting, with at least a first sensor, a first device housing of the electronic device being pivoted about a hinge relative to a second device housing to a deformed geometry where the first device housing and second device housing define a substantially orthogonal angle. At 1018, the method comprises detecting, with at least a second sensor, a rotational lifting operation of the electronic device in three-dimensional space. At 1018, in response to the at least a first sensor detecting the deformed geometry and the at least a second sensor detecting the rotational lifting operation, the method comprises causing, with one or more processors, an image capture device of the electronic device to enter a video recording mode of operation.

At 1019, the lifting operation of 1018 causes a rotation of the electronic device in the three-dimensional space by at least ninety degrees. At 1020, the lifting operation of 1018 causes a gravity direction to pass through a width of both the first device housing and the second device housing.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method in an electronic device, the method comprising:

detecting, with one or more sensors, a partially deformed geometric form factor defined by a first device housing of the electronic device being pivoted about a hinge relative to a second device housing of the electronic device partially between an axially displaced open position and a closed position;

also detecting, with one or more other sensors, gesture input indicating a camcorder support condition is supporting the electronic device in three-dimensional space while the partially deformed geometric form factor is occurring; and enabling, with one or more processors in response to detecting the partially deformed geometric form factor and the camcorder support condition being applied to the second device housing of the electronic device, a video recording mode of operation of an image capture device of the electronic device.

2. The method of claim 1, wherein the gesture input comprises a lifting operation elevating the electronic device from a first position to a second position in the three-dimensional space.

3. The method of claim 1, wherein the gesture input comprises a lifting operation moving the electronic device to a position in the three-dimensional space where a gravity direction passes through a width of the first device housing and the second device housing.

4. The method of claim 1, wherein the gesture input comprises a lifting operation moving the electronic device to a position in the three-dimensional space where another image capture device captures one or more images of an eye of a user of the electronic device.

5. The method of claim 1, wherein the gesture input comprises a camcorder grip being applied to the electronic device.

6. The method of claim 5, wherein the camcorder grip is defined by a heel of a hand supporting a first minor surface of the second device housing.

7. The method of claim 6, wherein the camcorder grip is further defined by one or more fingers supporting a second minor surface of the second device housing separated from the first minor surface by a width of the second device housing.

8. The method of claim 7, wherein the camcorder grip is further defined by a thumb supporting a third minor surface of the second device housing extending from the first minor surface to the second minor surface.

9. The method of claim 1, wherein the video recording mode of operation of the image capture device of the electronic device results in the image capture device capturing one or more video clips, further comprising performing, by the one or more processors, a cropping operation to remove from the one or more video clips any video segments captured by the image capture device while the first device housing was moving about the hinge relative to the second device housing.

10. The method of claim 1, further comprising detecting, with the one or more sensors, the first device housing moving about the hinge relative to the second device housing to either the axially displaced open position or the closed position, and disabling, with the one or more processors, the video recording mode of operation of the image capture device of the electronic device.

11. The method of claim 1, wherein the partially deformed geometric form factor comprises the first device housing of the electronic device being pivoted about the hinge relative to the second device housing of the electronic device such that the first device housing and second device housing define substantially an orthogonal angle.

12. An electronic device, comprising:
a first device housing coupled to a second device housing by a hinge such that the first device housing is pivotable about the hinge relative to the second device housing between a closed position and an axially displaced open position;
one or more sensors operable to determine a deformed geometric form factor of the electronic device when the first device housing is partially pivoted about the hinge relative to the second device housing between the axially displaced open position and the closed position;
one or more other sensors operable to detect when the electronic device is supported in a camcorder orientation in three-dimensional space;
an image capture device; and
one or more processors operable with the one or more sensors, the one or more other sensors, and the image capture device, the one or more processors operable to cause the image capture device to enter a video recording mode of operation in response to the electronic device being supported in the camcorder orientation while the electronic device is in the deformed geometric form factor.

13. The electronic device of claim 12, wherein the one or more processors are operable to cause the image capture device to cease the video recording mode of operation when the first device housing is pivoted about the hinge relative to the second device housing to either the axially displaced open position or the closed position.

14. The electronic device of claim 12, wherein the one or more processors are operable to cause the image capture device to cease the video recording mode of operation in response to the one or more other sensors detecting cessation of support of the electronic device in the camcorder orientation in the three-dimensional space.

15. The electronic device of claim 12, wherein the one or more processors are operable to crop video segments captured by the image capture device while in the video recording mode of operation while the first device housing is moving about the hinge relative to the second device housing.

16. The electronic device of claim 12, wherein the one or more other sensors comprise grip sensors carried by a device housing of the electronic device.

17. The electronic device of claim 12, wherein the one or more other sensors comprise an orientation detector.

18. A method in an electronic device, the method comprising:
detecting, with at least a first sensor, a first device housing of the electronic device being pivoted about a hinge relative to a second device housing to a deformed geometry where the first device housing and second device housing define a substantially orthogonal angle;
detecting, with at least a second sensor, a rotational lifting operation of the electronic device in three-dimensional space; and
in response to the at least a first sensor detecting the deformed geometry and the at least a second sensor detecting the rotational lifting operation, causing, with one or more processors, an image capture device of the electronic device to enter a video recording mode of operation.

19. The method of claim 18, wherein the lifting operation causes a rotation of the electronic device in the three-dimensional space by at least ninety degrees.

20. The method of claim 18, wherein the lifting operation causes a gravity direction to pass through a width of both the first device housing and the second device housing.

* * * * *